United States Patent [19]
Kamikubo

[11] Patent Number: 5,903,379
[45] Date of Patent: May 11, 1999

[54] SCANNING OPTICAL SYSTEM

[75] Inventor: Junji Kamikubo, Tokyo, Japan

[73] Assignee: Asahi Kogaku Kogyo Kabushiki Kaisha, Tokyo, Japan

[21] Appl. No.: 08/826,664

[22] Filed: Apr. 7, 1997

[30] Foreign Application Priority Data

Apr. 8, 1996 [JP] Japan .................................. 8-111278

[51] Int. Cl.⁶ .................................................. G02B 26/08
[52] U.S. Cl. ........................ 359/212; 359/216; 359/226
[58] Field of Search ................................. 359/196–226, 359/511; 347/256–261; 250/234–236

[56] References Cited

U.S. PATENT DOCUMENTS

| | | |
|---|---|---|
| 4,796,963 | 1/1989 | Yoshimura . |
| 4,863,227 | 9/1989 | Takanashi . |
| 5,153,608 | 10/1992 | Genovese ................................ 359/211 |
| 5,251,055 | 10/1993 | Koide ..................................... 359/216 |

FOREIGN PATENT DOCUMENTS 63-49726  3/1988  Japan .

*Primary Examiner*—James Phan
*Attorney, Agent, or Firm*—Greenblum & Bernstein, P.L.C.

[57] ABSTRACT

A scanning optical comprises a light source, a rotating mirror for deflecting and scanning a light beam emitted form the light source, a scanning lens for converging the light beam deflected by the rotating mirror onto an object surface, a transparent cover plate obliquely disposed between the rotating mirror and the scanning lens, and a transparent compensation plate obliquely disposed between the cover plate and the object surface. The cover plate has no power and a normal of the cover plate is inclined at a predetermined angle with respect to a main scanning plane. The compensation plate has no power and a normal of the compensation plate is inclined at a predetermined angle with respect to the main scanning plane.

10 Claims, 6 Drawing Sheets

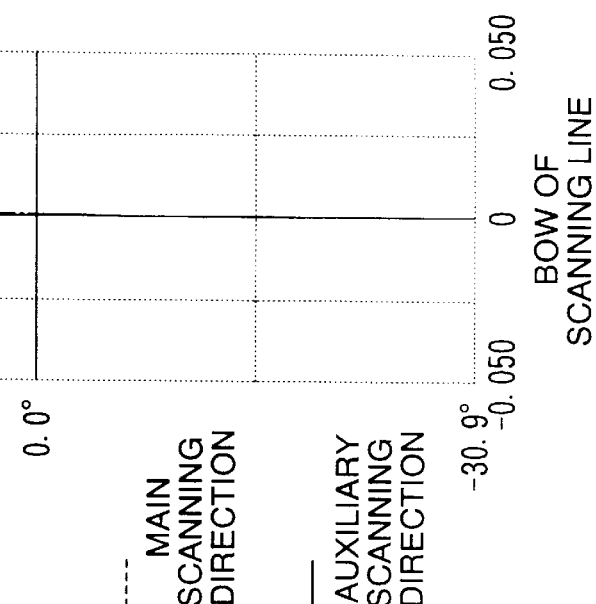
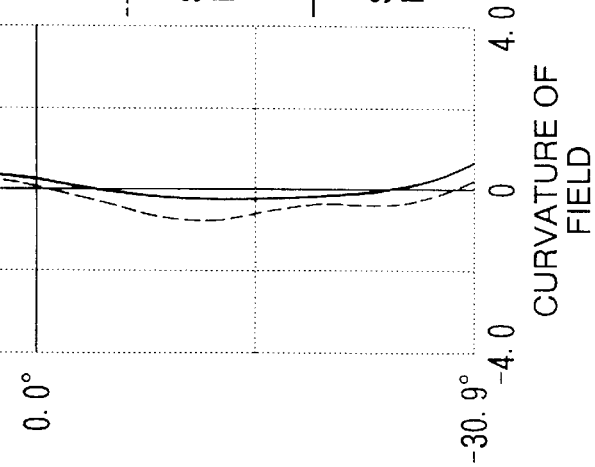
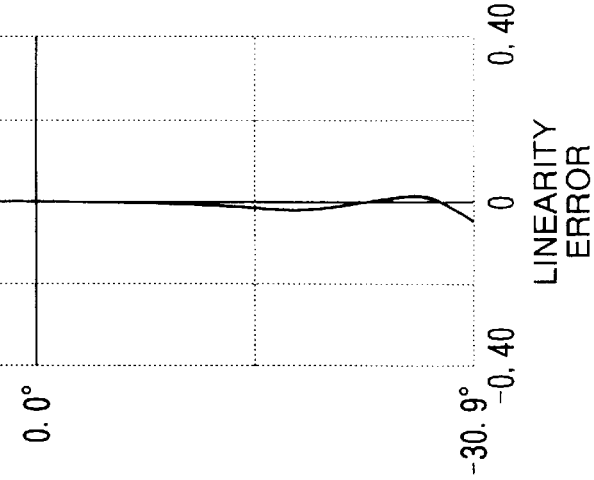

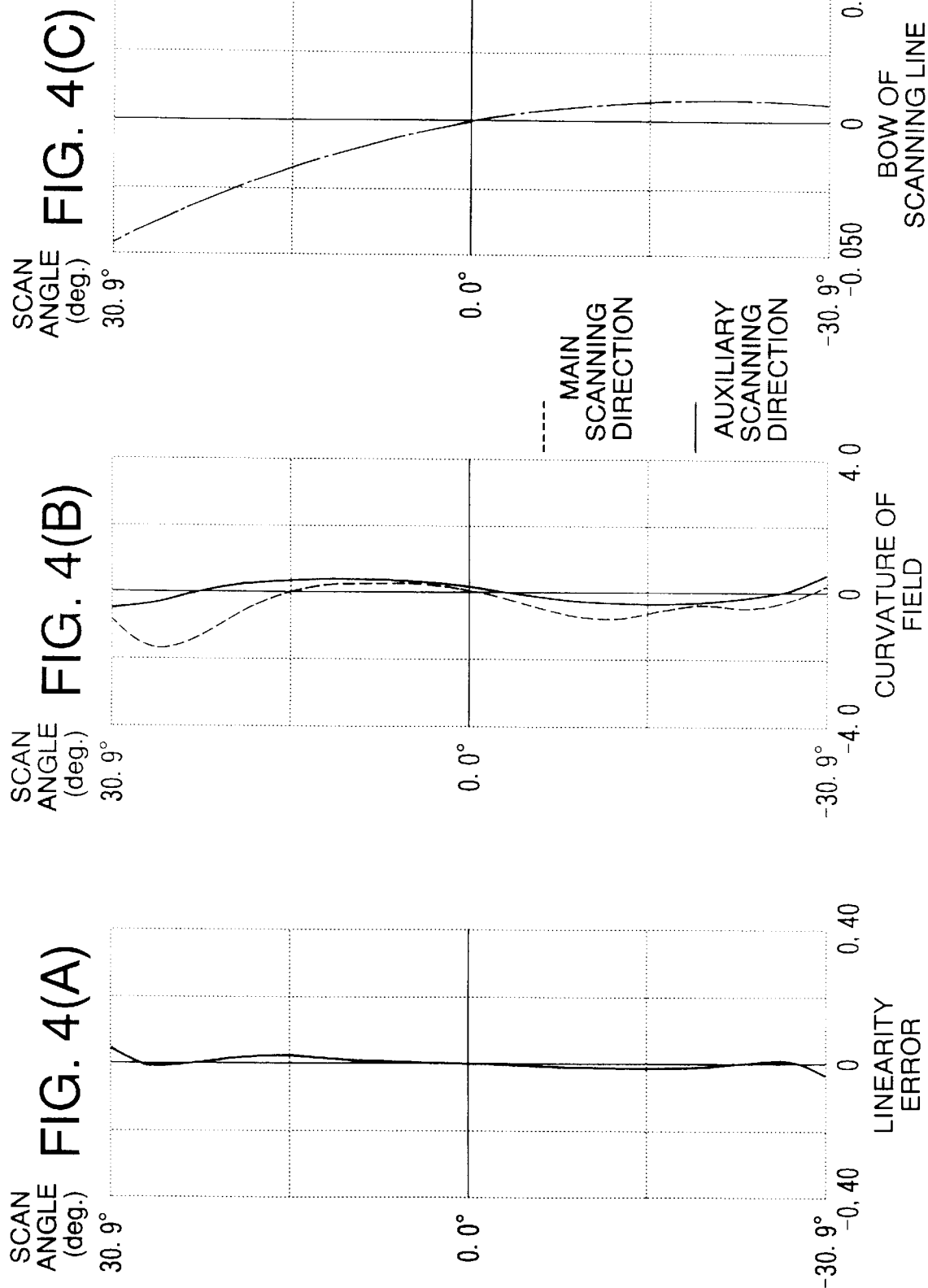

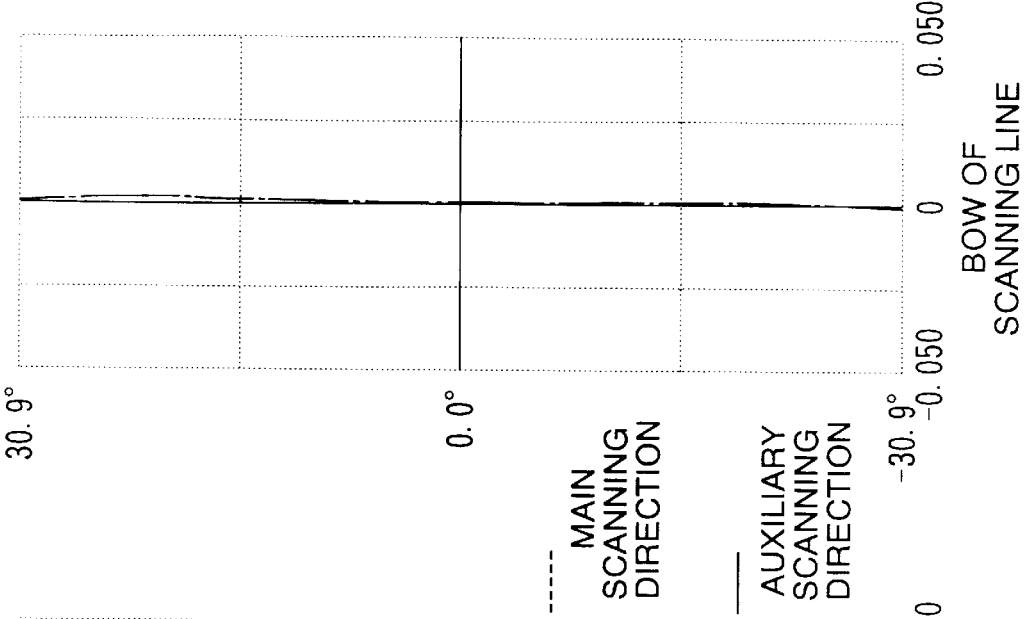
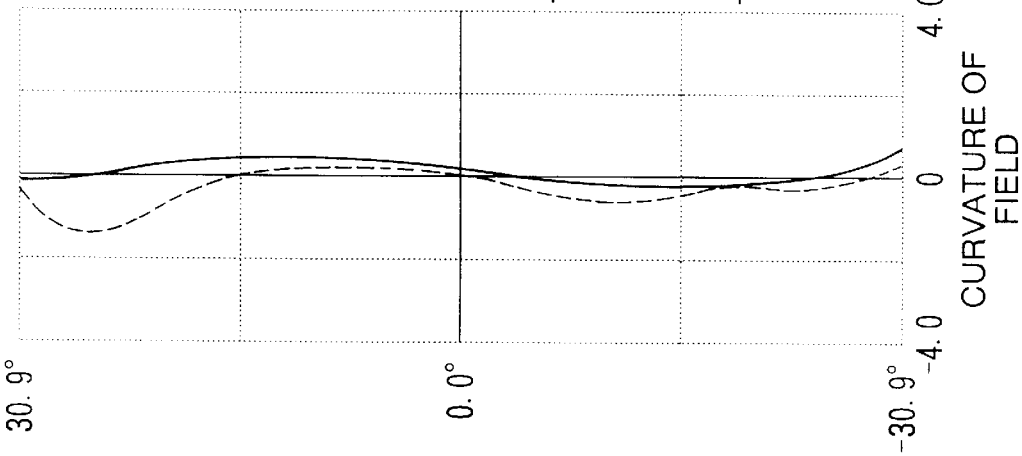
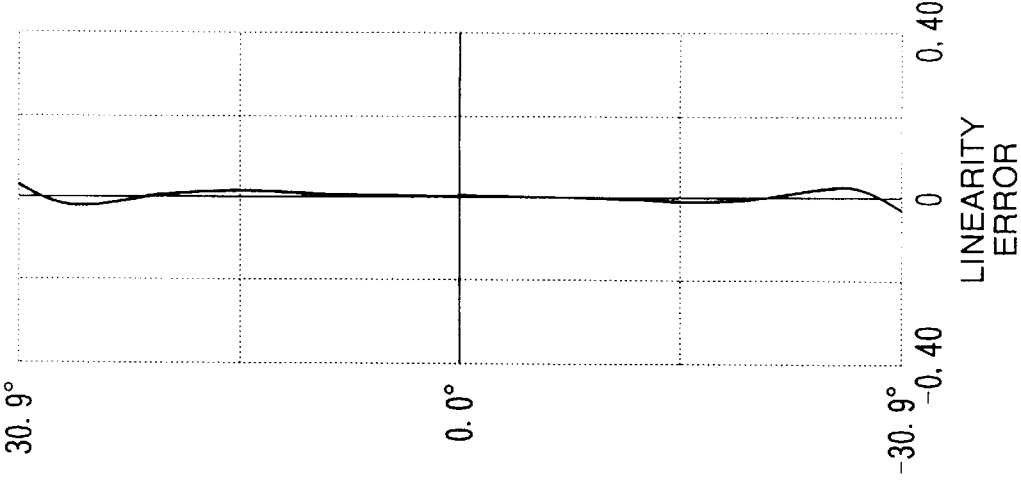

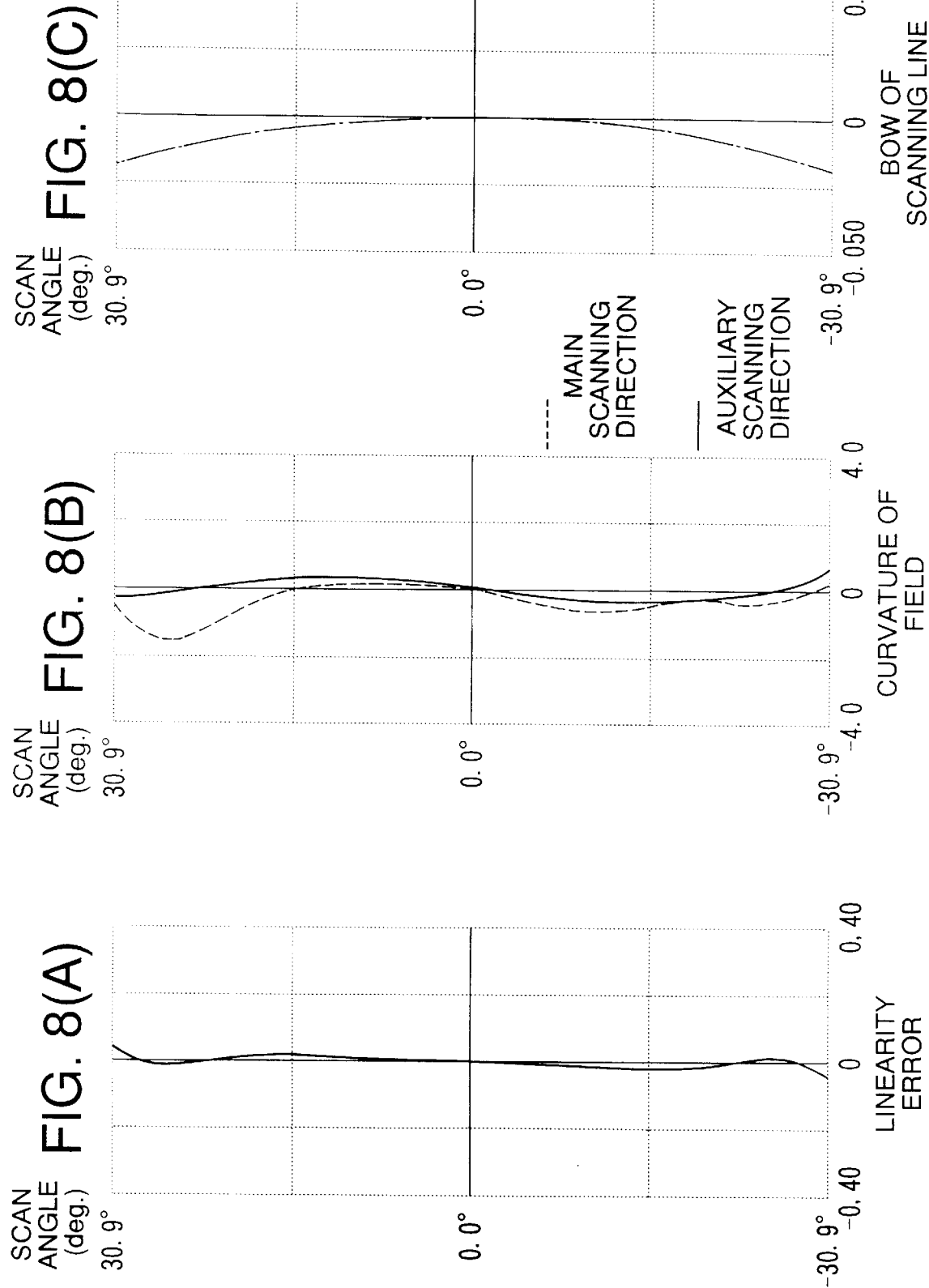

SCANNING OPTICAL SYSTEM

BACKGROUND OF THE INVENTION

The present invention relates to a scanning optical system used in an optical scanning unit of a laser beam printer or the like.

In a scanning optical system, a rotating polygon mirror is used to scan a light beam from a light source. Conventionally, the polygon mirror is enclosed by a cover unit in order to prevent the generation of sound due to the rotation of the polygon mirror and to avoid damage to the reflecting surfaces of the polygon mirror from collisions with dust or debris in the air. In order to allow the passage of an incident light beam from the light source to the polygon mirror and of a scanning light beam reflected from the polygon mirror, the cover unit is provided with a cover glass plate through which the incident light beam and the scanning light beam pass.

If the cover glass plate is parallel to the rotation axis of the polygon mirror, that is, if the cover glass plate is perpendicular to a main scanning plane, a part of the incident light beam or the scanning light beam may be reflected at a surface of the cover glass plate. This "ghost light" may remain reach the object surface and generate noise in the scanning light beam. This problem is particularly noticeable in an optical system in which one cover glass plate is provided for the transmission of both the incident light beam and the scanning light beam.

The problem of "ghost light" was addressed in Japanese Laid Open Patent Publication No. Sho 63-49726, disclosing a scanning optical system provided with a cover glass plate. The cover glass plate transmits both the incident light beam and the scanning light beam and is inclined with respect to the rotation axis of the polygon mirror. Since the rotation axis of the polygon mirror is perpendicular to the main scanning plane, a normal with respect to the cover glass plate is inclined with respect to the main scanning plane. In this way, any unwanted reflected light, "ghost light", is directed away from the path of the scanning light beam (i.e., away from the object surface).

However, with the cover glass plate arranged such that the normal thereof is inclined with respect to the main scanning plane, the scanning light beam is shifted in the auxiliary scanning direction during transmission through the cover glass plate. As the polygon mirror rotates, the incident angle of the scanning light beam on the cover glass plate in relation to an auxiliary scanning direction varies, and thus, the amount of the shift of the scanning light beam varies throughout the scanning angle, and thus the scanning line formed on the object surface will be curved. That is, there will be a bow in the scanning line.

SUMMARY OF THE INVENTION

It is therefore an object of the present invention to provide an improved scanning optical system in which both the problems of "ghost light" and of bow in the scanning line are reduced.

According to an aspect of a scanning optical system according to the present invention comprises a light source, a rotating mirror for deflecting and scanning a light beam emitted form the light source, a scanning lens for converging the light beam deflected by the rotating mirror onto an object surface, a transparent cover plate obliquely disposed between the rotating mirror and the scanning lens, and a transparent compensation plate obliquely disposed between the cover plate and the object surface. The cover plate has no power and a normal of the cover plate is inclined at a predetermined angle with respect to a main scanning plane. The compensation plate has no power and a normal of the compensation plate is inclined at a predetermined angle with respect to the main scanning plane.

With the above construction, the bow of the scanning line caused by the cover plate can be compensated by the function of the compensation plate. The compensation plate has no power, it may be a plane-parallel plate or a prism of which incident and exit surfaces are angled.

BRIEF DESCRIPTION OF THE DRAWINGS

FIGS. 3 (A) 3(B) and 3(C) are graphs showing the linearity error, the curvature of field and the bow of the scanning line according to the first embodiment respectively;

FIGS. 4(A), 4(B) and 4(C) are graphs showing the linearity error, the curvature of field and the bow of the scanning line according to the compared example where the compensation plate is removed from the first embodiment respectively;

FIGS. 7(A), 7(B) and 7(C) are graphs showing the linearity error, the curvature of field and the bow of the scanning line according to the second embodiment respectively; and FIGS. 8(A), 8(B) and 8(C) are graphs showing the linearity error, the curvature of field and the bow of the scanning line according to the compared example where the compensation plate is removed from the second embodiment respectively.

DETAILED DESCRIPTION OF THE PREFERRED EMBODIMENTS

Figure 1:
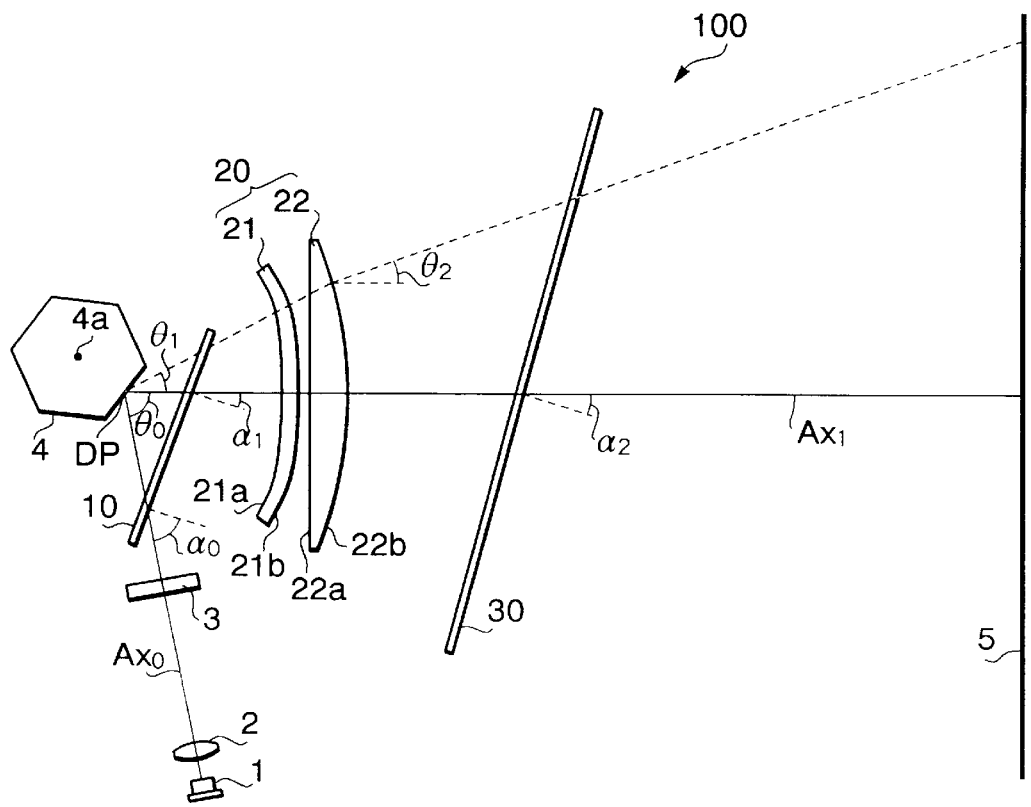
FIG. 1 shows an arrangement of the scanning optical system according to the first embodiment in the main scanning direction.
Figure 2:
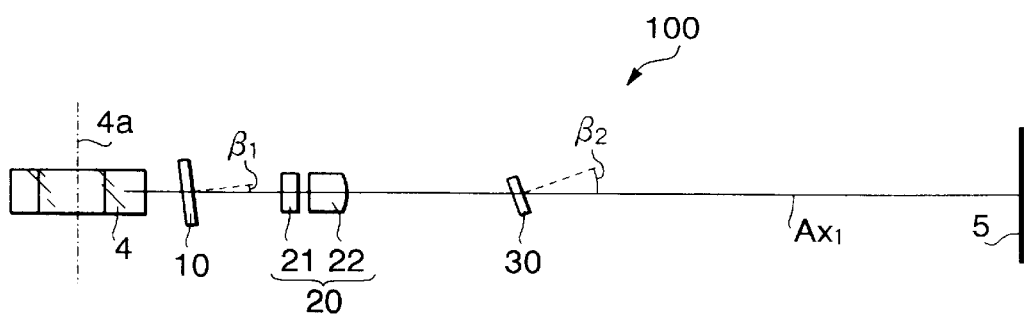
FIG. 2 shows the arrangement of the optical system shown in FIG. 1 in the auxiliary scanning direction.

FIG. 1 is a schematic view of a main scanning plane of a scanning optical system 100 according to a first embodiment of the invention. FIG. 2 is a schematic sectional view of an auxiliary scanning plane of the scanning optical system 100. The general arrangement and operation of the scanning optical system 100 are now described with reference to FIGS. 1 and 2.

In the scanning optical system 100, a diverging light beam generated by a semiconductor laser 1 as a light source travels along an incident optical axis Ax0 to a polygon mirror 4 as a rotating mirror. Along the incident optical axis Ax0, the light beam is first collimated by a collimator lens 2, then passes through a cylindrical lens 3 in which the incident light beam is converged, (only in the auxiliary scanning direction) to form a linearly spread image (a line focus) in the vicinity of a reflecting surface of the rotating mirror 4. The polygon mirror 4 rotates about a rotation axis 4a such that the incident light beam is deflected to scan through a predetermined scanning angle in the main scanning direction. The scanning light beam is converged to form a beam spot on an object surface 5 by an fθ lens 20 as a scanning lens. The fθ lens 20 is designed to convert the linearly focused light beam from the polygon mirror 4 into a circular scanning beam spot on the object surface 5.

The optical axis of the fθ lens 20 is defined as a scanning optical axis Ax1. As the scanning light beam moves through the scanning angle, the scanning beam spot draws a scanning line on the object surface 5.

In the specification, the term "main scanning plane" means a plane that includes the scanning optical axis Ax1 and that is perpendicular to the rotation axis 4a of the polygon mirror 4 (see FIG. 1) and the term "auxiliary scanning plane" means a plane that includes the scanning optical axis Ax1 and that is parallel to the rotation axis 4a of the polygon mirror 4 (see FIG. 2). A "main scanning direction" and an "auxiliary scanning direction" are defined accordingly.

The polygon mirror 4 rotates at a high speed and is thus enclosed by a polygon mirror cover (not shown) in order to prevent the generation of sound due to the rotation and also to avoid damage to the reflecting surfaces of the polygon mirror 4 from collisions with dust or debris in the air. As shown in FIG. 1, the scanning optical system 100 further includes a transparent cover plate 10 that is provided in the polygon mirror cover. In the present embodiment, the cover plate 10 is arranged so that both the incident light beam from the semiconductor laser 1 and the scanning light beam from the polygon mirror 4 pass through the plate 10.

The cover plate 10 is a plane-parallel plate and a normal to the cover plate 10 is inclined with respect to the main scanning plane so that any light reflected from a surface of the cover plate 10 (referred to as "ghost light") is not transmitted to the object surface 5. The ghost light beam is directed out of the main scanning plane and therefore will not contact the object surface 5.

However, such the oblique arrangement of the cover plate causes a bow in the scanning line at the object surface 5. Thus, the scanning optical system 100 is further provided with a transparent compensation plate 30 between the fθ lens 20 and the object surface 5 to compensate for the bow of the scanning line. The compensation plate 30 is formed as a plane-parallel plate and is positioned such that the normal thereof is inclined with respect the main scanning plane.

The fθ lens 20 includes a plastic first lens 21, having an incident surface 21a and an exit surface 21b, and a glass second lens 22, having an incident surface 22a and an exit surface 22b, positioned in that order between the polygon mirror 4 and the object surface 5. The incident surface 21a and the exit surface 21b of the first lens 21 are formed as advanced toric or toridal surfaces. An advanced toric surface is defined as a locus formed from the rotation of a non-circular curved line about an axis in the main scanning direction.

The incident surface 22a of the second lens 22 is formed as a cylindrical surface having a negative power only in the auxiliary scanning direction. The exit surface 22b of the second lens 22 is a positive toric surface, that is, a locus formed from the rotation of an arc in the auxiliary scanning plane about an axis that is perpendicular to the optical axis Ax1 and is included in the auxiliary scanning plane.

Further, in relation to FIG. 1, the angle formed between the incident optical axis Ax0 and the scanning optical axis Ax1 is represented by θ0, and a "scan angle" is a variable angle between the scanning light beam and the optical axis Ax1 at a point between the polygon mirror 4 and the cover plate 10. In particular, a maximum scan angle θ1 is defined as an angle between a scanning light beam directed to the maximum image height (i.e., an edge of the scanning line) and the scanning optical axis Ax1 in the main scanning plane at a point between the polygon mirror 4 and the cover plate 10. Also, a secondary maximum scan angle θ2 is defined as an angle between a scanning light beam directed to the maximum image height and the scanning optical axis Ax1 at a point between the fθ lens 20 and the compensation plate 30.

In particular, a projected line of a normal with respect to the cover plate 10 into the main scanning plane forms a predetermined angle α0 with the incident optical axis Ax0, and a predetermined angle α1 with the scanning optical axis Ax1. Further, a projected line of a normal to the compensation plate 30 into the main scanning direction is inclined with respect the scanning optical axis Ax1 by a predetermined angle α2.

The cover plate 10 is also arranged such that the normal thereof is inclined with respect to the main scanning plane by a predetermined angle β1. A normal to the compensation plate 30 is inclined with respect to the main scanning plane by a predetermined angle β2.

In the present embodiment, the compensation plate 30 is arranged between the fθ lens 20 and the object surface 5. In this case, it is preferable that the angle β2 satisfy the condition $$|\beta 2|<2\times|m\times\theta 1^2\times d1\times n1\times \beta 1/(\theta 2^2\times d2\times n2)| \qquad (A),$$

where m is a magnification of the fθ lens 20 in the auxiliary scanning direction;

d1 is a thickness of the cover plate 10;

n1 is a refractive index of the cover plate 10;

d2: thickness of the compensation plate 30; and n2: refractive index of the compensation plate 30.

When the condition (A) is satisfied, the bow of the scanning line in the auxiliary scanning direction is appropriately compensated.

The development of the condition (A) is now described. Since the cover plate 10 is inclined by the angle β1 with respect to the optical axis Ax1 in the auxiliary scanning plane (as shown in FIG. 2), when the scanning light beam passes through the cover plate 10, the transmitted light beam is parallel to, but shifted from, the incident light beam in the auxiliary scanning direction. The amount of the shift of the scanning light beam is proportional to the square of the scan angle η.

The difference ΔZ1 between the shift amount of the scanning light beam on the scanning optical axis Ax1 (θ=0) and that of the scanning light beam at the maximum image height (θ=θ1) causes the bow of the scanning line. The difference ΔZ1 is given by $$\Delta Z1 \approx A \times \theta 1^2 \times d1 \times \sin(\beta 1-\beta 1')/\cos\beta 1' \qquad (1),$$

where

A: proportional constant

β1': angle formed between the scanning light beam within the cover plate 10 and the projected line of the normal to the cover plate 10 into the main scanning plane.

As shown in FIG. 1, the scanning light beam is incident on the compensation plate 30 at the maximum image height at the secondary maximum scan angle θ2 that is different from the maximum scan angle θ1 due to the effect of the fθ lens 20.

In this case, the difference ΔZ2 between the shift amount of the scanning light beam at the optical axis Ax1 (θ=0) and that of the scanning light beam at the maximum image height ($\theta=\theta 2$) at the compensation plate 30 also causes a bow of the scanning line. The difference $\Delta Z2$ is given by $$\Delta Z2 \approx A \times \theta 2^2 \times d2 \times \sin(\beta 2 - \beta 2')/\cos \beta 2' \quad (2),$$

where $\beta 2'$ is an angle formed between the scanning light beam within the compensation plate 30 and the projected line of the normal to the compensation plate 30 into the main scanning plane.

Since the difference $\Delta Z1$ is magnified m times in the auxiliary scanning direction by the magnification of the f$\theta$ lens 20, the compensation plate 30 is required to compensate for a difference of $m \times \Delta Z1$. Thus, when the following condition (3) holds, the bow of the scanning line is compensated, $$\Delta Z2 = -m \times \Delta Z1 \quad (3).$$

Using the approximation $\sin(\beta-\beta')/\cos \beta' \approx 0.27 \times n \times \beta$ in the equation (3), and solving for $\beta 2$ provides, $$\theta 2^2 \times d2 \times n2 \times \beta 2 = -m \times \theta 1^2 \times d1 \times n1 \times \beta 1 \quad (3') \text{ and}$$

$$\beta 2 = -m \times \theta 1^2 \times d1 \times n1 \times \beta 1/(\theta 2^2 \times d2 \times n2) \quad (4).$$

If the value of $\beta 2$ is set according to the equation (4), the bow of the scanning line will be substantially compensated. However, in a conventionally available optical scanning device, if the absolute value of the angle $\beta 2$ is less than twice the absolute value of the right side of the equation (4), i.e., when the condition (A) is satisfied, the bow of the scanning line is within an allowable range.

In this case where the compensation plate 30 is arranged between the f$\theta$ lens 20 and the object surface 5, $\beta 1 \times \beta 2$ will be larger than zero ($\beta 1 \times \beta 2 > 0$). The compensation plate 30 may alternatively be arranged between the cover plate 10 and the f$\theta$ lens 20. In this case, the difference $\Delta Z1$ is not magnified by the f$\theta$ lens 20, and accordingly, the bow of the scanning line can be compensated when the following equation (5) holds $$\beta 2 = -1 \times \theta 1^2 \times d1 \times n1 \times \beta 1/(\theta 2^2 \times d2 \times n2) \quad (5).$$

In this case, $\beta 1 \times \beta 2$ will be less than zero ($\beta 1 \times \beta 2 < 0$). On the basis of the same allowable range, it is enough to satisfy the following condition (B).

$$|\beta 2| < 2 \times |-1 \times \theta 1^2 \times d1 \times n1 \times \beta 1/(\theta 2^2 \times d2 \times n2)| \quad (B),$$

A numerical example for the scanning optical system according to the first embodiment is now described with reference to TABLEs 1, 2 and 3. In this numerical example, the cover plate 10 and the compensation plate 30 are both formed having a thickness of 2.0 mm and a refractive index of 1.51072 at a wavelength of 780 nm. Further, defining the intersecting point between the incident optical axis Ax0 and the scanning optical axis Ax1 as a standard "deflecting point" DP, the distance from the deflecting point DP to the cover plate 10 along the scanning optical axis Ax1 is 17.0 mm and the distance from the exit surface 22b of the second lens 22 to the compensation plate 30 along the scanning optical axis Ax1 is 50.0 mm. Characteristic values for the other optical elements are provided in TABLE 1.

In TABLE 1, f denotes the focal length of the f$\theta$ lens 20 in the main scanning direction, ry denotes a radius of curvature in the main scanning direction, rz denotes a radius of curvature in the auxiliary scanning direction, d denotes a distance between surfaces along the relevant optical axis (Ax0 or Ax1) and n denotes a refractive index at a wavelength of 780 nm. Also, as defined above, the maximum scan angle $\theta 1$ is defined as an angle between a scanning light beam directed to the maximum height on the object surface 5 (i.e., at the end of the scanning width/range) and the optical axis Ax1, and the length of the scanning line is determined accordingly.

Surface numbers 1 and 2 represent the cylindrical lens 3, surface number 3 represents the polygonal mirror 4, surface numbers 4 and 5 represent the incident surface 21a and the exit surface 21b of the first lens 21, and surface numbers 6 and 7 represent the incident surface 22a and the exit surface 22b of the second lens 22.

The advanced toric surfaces 21a and 21b of the first lens 21 are defined as a locus formed by rotating a non-circular curved line extending in the main scanning direction about an axis in the main scanning direction. The non-circular curved line is defined by the following equation;

$$X = \frac{CY^2}{1+\sqrt{1-(1+K)C^2Y^2}} + A4Y^4 + A6Y^6 + A8Y^8. \quad (6)$$

In particular, X is a SAG, that is, a height of a curve measured from the tangential line at the point where the height from the optical axis is Y. C is a curvature (1/r) on the optical axis, K is a conic constant and A4, A6 and A8 are aspherical coefficients of fourth, sixth and eighth orders. These values and coefficients are shown in TABLE 2.

TABLE 1 f = 200.0 mm Length of Scanning Line 216 mm
Max. Scan Angle 30.9 deg., m = −2.97

| Surface No. | ry | rz | d | n |
|---|---|---|---|---|
| 1 | ∞ | 30.000 | 4.000 | 1.51072 |
| 2 | ∞ | ∞ | 57.040 | |
| 3 | ∞ | ∞ | 47.000 | |
| 4 | 2000.000 | −343.500 | 5.000 | 1.48617 |
| 5 | −1000.000 | 500.000 | 2.500 | |
| 6 | ∞ | −56.890 | 12.000 | 1.51072 |
| 7 | −118.570 | −17.500 | 199.000 | |

TABLE 2

| Surface No. | K | A4 | A6 | A8 |
|---|---|---|---|---|
| 4 | 10.00 | −4.730 × 10$^{-6}$ | −4.100 × 10$^{-10}$ | 5.190 × 10$^{-13}$ |
| 5 | 25.00 | −3.990 × 10$^{-6}$ | −2.500 × 10$^{-10}$ | 2.410 × 10$^{-13}$ |

Note that the radiuses of curvature shown in TABLE 1 for the fourth and fifth surfaces are the values at the vertices.

For instance, the surface number 4 in TABLE 1, i.e., the incident surface 21a of the first lens 21, is defined by rotating the non-circular curved line defined by the equation (6) about a rotation axis in the main scanning direction. The intersection point between the rotation axis and the scanning optical axis Ax1 is 343.5 mm from the intersection point between the incident surface 21a and the scanning optical axis Ax1 in the same direction as the polygon mirror 4.

Further, the surface number 5 in TABLE 1, i.e., the exit side surface 21b of the first lens 21, is defined in the same manner as the incident side surface 21a. In this case, the intersection point between the rotation axis and the scanning optical axis Ax1 is 500.0 mm from the intersection point between the exit surface 21b and the scanning optical axis Ax1 in the same direction as the object surface 5.

The various angles described above and shown in FIGS. 1 and 2 are listed in TABLE 3.

TABLE 3

| Angle | Value |
| --- | --- |
| $\alpha 0$ | 60.0 degrees |
| $\alpha 1$ | 20.0 degrees |
| $\alpha 2$ | 15.0 degrees |
| $\gamma$ | 80.0 degrees |
| $\theta 1$ | 30.9 degrees |
| $\theta 2$ | 20.3 degrees |
| $\beta 1$ | 3.0 degrees |
| $\beta 2$ | 20.0 degrees |

In this numerical example, the calculated value of $\beta 2$ using the equation (4) is 20.6 degrees. By using a value of $|\beta 2|(=20.0$ deg.), the equation (4) substantially holds and thus the bow of the scanning line can be reduced. Additionally, since the value of right side of the condition (A) is 41.3 deg. that is larger than the left side $|\beta 2|(=20.0$ deg.), the first embodiment satisfies the condition (A).

FIGS. 3(A), 3(B) and 3(C) show characteristics of the scanning optical system according to the first embodiment. FIG. 3(A) shows the linearity error, FIG. 3(B) shows the curvature of field (Dotted line: main scanning direction, Solid line: auxiliary scanning direction), and FIG. 3(C) show the bow of the scanning line. The vertical axis represents the scan angle $\theta$ (unit: degree) and the horizontal axis represents the amount of aberration (unit: millimeters).

FIGS. 4(A), 4(B) and 4(C) show the same characteristics when the compensation plate 30 is removed from the optical system 100 as a comparative example. As can be seen by comparing FIGS. 3 and 4, the bow of the scanning line is compensated by the function of the compensation plate 30 for without deteriorating the linearity error or the curvature of field.

Figure 5:
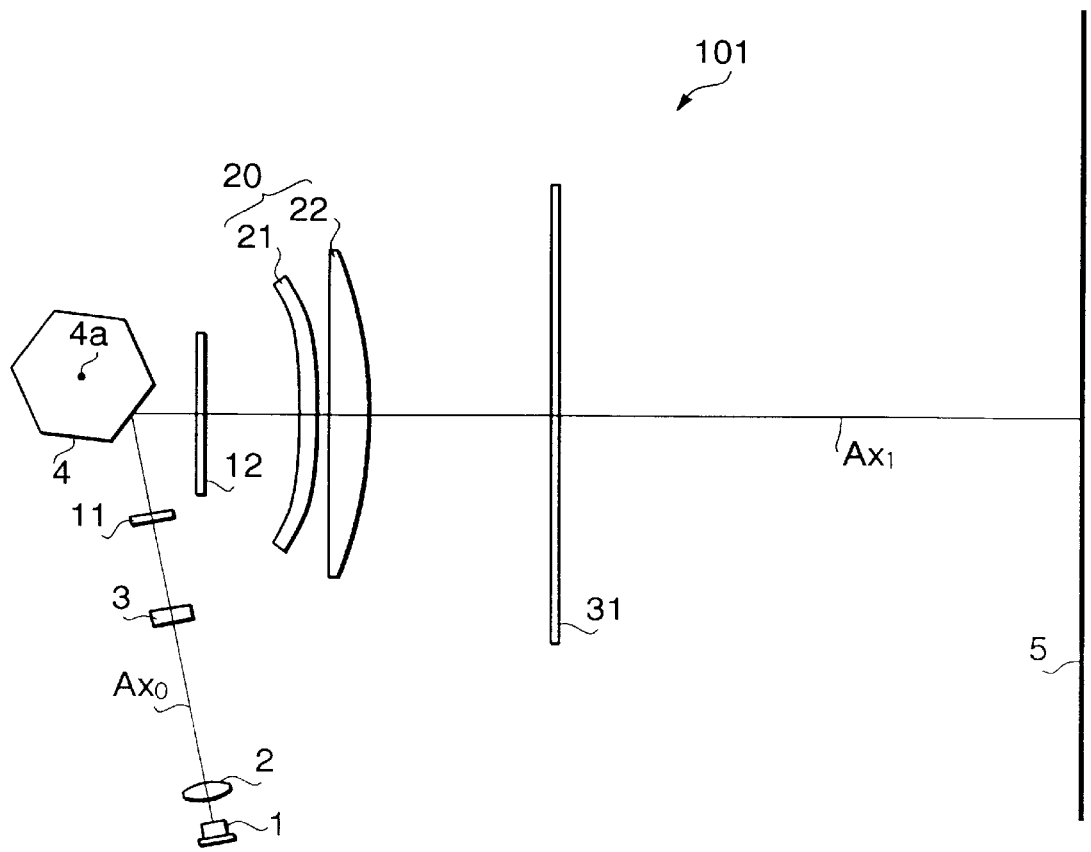
FIG. 5 shows an arrangement of the scanning optical system according to the second embodiment in the main scanning direction.
Figure 6:
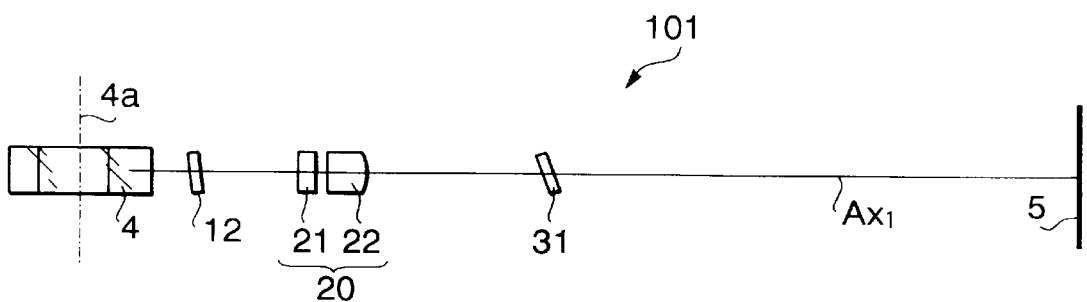
FIG. 6 shows the arrangement of the optical system shown in FIG. 5 in the auxiliary scanning direction.

FIGS. 5 and 6 show a scanning optical system 101 according to a second embodiment. FIG. 5 shows the scanning optical system 101 in the main scanning plane and FIG. 6 shows the scanning optical system 101 in the auxiliary scanning plane. Elements that are identical to those of the first embodiment are given the same reference numbers.

In the second embodiment, a first cover plate 11 is positioned between the cylindrical lens 3 and the polygon mirror 4, a second cover plate 12 is located between the polygon mirror 4 and the f$\theta$ lens 20, and a compensation plate 31 is located between the f$\theta$ lens 20 and the object surface 5. The first cover plate 11 is arranged perpendicular to the optical axis Ax0. The second cover plate 12 and the compensation plate 31 are perpendicular to the optical axis Ax1 in the main scanning plane (as shown in FIG. 5), but the normals (with respect to each) are inclined with respect to the optical axis Ax1 by predetermined angles $\beta 3$ and $\beta 4$ respectively, in the auxiliary scanning plane (as shown in FIG. 6).

A numerical values for the second are the same as those of the first embodiment except that the distance between the cylindrical lens 3 (i.e., surface 2) and the polygon mirror 4 (i.e., surface 3) is 57.120 mm in the second embodiment. In the second embodiment, the distance from the deflecting point DP to the cover plate 12 along the optical axis Ax1, the distance from the exit side surface 22$b$ to the compensation plate 31, and the thicknesses and the refractive indexes of the cover plate 12 and the compensation plate 31 are identical to the same values for the cover plate 10 and the compensation plate 30 of the first embodiment. TABLE 4 shows the various angles for the second embodiment.

In this numerical example for the second embodiment, the calculated value of $\beta 2$ using the equation (4) is 20.6 degrees.

By using a value of $|\beta 2|=22.5$ deg., the equation (4) substantially holds and thus the bow of the scanning line can be reduced in a low level. Additionally, since the value of right side of the condition (A) is 41.3 deg. that is larger than the left side $|\beta 2|(=22.5$ deg.), the second embodiment satisfies the condition (A).

TABLE 4

| Angle | Value |
| --- | --- |
| $\alpha 0$ | 0.0 degrees |
| $\alpha 1$ | 0.0 degrees |
| $\alpha 2$ | 0.0 degrees |
| $\gamma$ | 80.0 degrees |
| $\theta 1$ | 30.9 degrees |
| $\theta 2$ | 20.3 degrees |
| $\beta 1$ | 3.0 degrees |
| $\beta 2$ | 22.5 degrees |

FIGS. 7(A), 7(B) and 7(C) show characteristics of the scanning optical system according to numerical example for the second embodiment. FIG. 7(A) shows the linearity error, FIG. 7B shows the curvature of field (Dotted line: main scanning direction, Solid line: auxiliary scanning direction), and FIG. 7(C) shows the bow of the scanning line.

FIGS. 8(A), 8(B) and 8(C) show the same characteristics when the compensation plate 31 is removed from the optical system as a comparative example. As can be seen by comparing FIGS. 7 and 8, in the second embodiment, the bow of the scanning line is compensated by the compensation plate 31 without deteriorating the linearity error and the curvature of field.

As described above, a bow of the scanning line may be compensated for by the compensation plate even if the cover plate is arranged at some angle with respect to the main scanning plane in order to prevent ghost light. Accordingly, the position of a beam spot (i.e., the scanning line) on the object surface can be accurately controlled.

Although the structure and operation of an optical scanning system is described herein with respect to the preferred embodiments, many modifications and changes can be made without departing from the spirit and scope of the invention.

The present disclosure relates to subject matter contained in Japanese Patent Application No. HEI 08-111278, filed on Apr. 8, 1996, which is expressly incorporated herein by reference in its entirety.

What is claimed is:

1. An scanning optical system comprising:

a light source;

a rotating mirror for deflecting and scanning a light beam emitted from said light source;

a scanning lens for converging said light beam deflected by said rotating mirror onto an object surface;

a transparent cover plate located between said rotating mirror and said scanning lens, said cover plate having no power, and a normal with respect to said cover plate being inclined at a predetermined angle with respect to a main scanning plane that includes an optical axis of said scanning lens and is perpendicular to a rotation axis of said rotating mirror; and a transparent compensation plate arranged between said cover plate and said object surface, said compensation plate having no power and a normal of said compensation plate being inclined at a predetermined angle with respect to said main scanning plane.

2. The scanning optical system according to claim 1, wherein the inclination angle of the normal of said compensation plate with respect to said main scanning plane is determined to compensate a bow of the scanning line in an auxiliary scanning direction on said object surface, said bow being caused by said cover plate.

3. The scanning optical system according to claim 1, said compensation plate comprising a plane-parallel plate located between said scanning leas and said object surface.

4. The scanning optical system according to claim 3, said cover plate comprising a plane-parallel plate through which both the incident light beam into said rotating mirror and the deflected light beam by said rotating mirror pass, wherein said compensation plate satisfies the condition $$|\beta 2|<2\times |m\times \theta 1^2 \times d1 \times n1 \times \beta 1/(\theta 2^2 \times d2 \times n2)|,$$

where

- $\beta 1$ is an angle formed between the normal of said cover plate and said optical axis in an auxiliary scanning plane that includes said optical axis and said rotation axis;
- $\beta 2$ is an angle formed between the normal of the compensation plate and said optical axis in said auxiliary scanning plane;
- m is a magnification of said scanning lens in said auxiliary scanning direction;
- $\theta 1$ is an angle formed between the light beam directed to a maximum image height and said optical axis in said main scanning plane at the point between said rotating mirror and said cover plate;
- $\theta 2$ is an angle formed between the light beam directed to the maximum image height and said optical axis at the point between said scanning lens and said compensation plate;
- d1 is a thickness of said cover plate;
- n1 is a refractive index of said cover plate;
- d2 is a thickness of said compensation plate;
- n2 is a refractive index of said compensation plate.

5. The scanning optical system according to claim 4, said cover plate being arranged so that said normal of said cover plate is not parallel to said auxiliary scanning plane.

6. The scanning optical system according to claim 1, said cover plate and said compensation plate comprising plane-parallel plates of which normals are included in an auxiliary scanning plane that includes said optical axis and said rotation axis.

7. A scanning optical system comprising:

a light source;

a rotating mirror for deflecting a light beam from said light source to scan said light beam;

a scanning lens for converging said light beam deflected by said rotating mirror onto an object surface;

a transparent compensation plate having no power that is arranged between said scanning lens and said object surface, said compensation plate compensating a bow of the scanning line in an auxiliary scanning direction on said object surface, said compensation plate comprising a plane-parallel plate of which the normal is inclined with respect to a main scanning plane that includes an optical axis of said scanning lens and is perpendicular to a rotation axis of said rotating mirror.

8. The scanning optical system according to claim 7 further comprising a transparent cover plate arranged between said rotating mirror and said scanning lens, said cover plate having no power and a normal of said cover plate being inclined with respect to said main scanning direction, wherein an angle formed between the normal of said compensation plate is determined to compensate a bow of the scanning line in the auxiliary scanning direction on said object surface, and wherein said bow is caused by said cover plate.

9. A scanning optical system comprising:

a light source;

a rotating mirror for deflecting a light beam from said light source to scan said light beam;

a scanning lens for converging said light beam deflected by said rotating mirror onto an object surface; and two transparent plane-parallel plates that are arranged between said rotating mirror and said object surface, normals of said plane-parallel plates being inclined with respect to a main scanning plane that includes an optical axis of said scanning lens and is perpendicular to an rotation axis of said rotating mirror.

10. The scanning optical system according to claim 9, said scanning lens is arranged between said two plane-parallel plates, said normals being inclined in the same direction.

* * * * *